US011513567B2

(12) United States Patent
Liu et al.

(10) Patent No.: US 11,513,567 B2
(45) Date of Patent: Nov. 29, 2022

(54) ELECTRONIC DEVICE

(71) Applicants: Acer Incorporated, New Taipei (TW); LEOHAB ENTERPRISE CO., LTD, Taichung (TW)

(72) Inventors: Chi-Yuan Liu, New Taipei (TW); Chao-Chi Lin, Taichung (TW)

(73) Assignees: ACER INCORPORATED, New Taipei (TW); LEOHAB ENTERPRISE CO., LTD, Taichung (TW)

( * ) Notice: Subject to any disclaimer, the term of this patent is extended or adjusted under 35 U.S.C. 154(b) by 0 days.

(21) Appl. No.: 17/183,494

(22) Filed: Feb. 24, 2021

(65) Prior Publication Data
US 2022/0075428 A1 Mar. 10, 2022

(30) Foreign Application Priority Data

Sep. 9, 2020 (TW) ................................ 109130883

(51) Int. Cl.
*G06F 1/16* (2006.01)
(52) U.S. Cl.
CPC .......... *G06F 1/1681* (2013.01); *G06F 1/1618* (2013.01)
(58) Field of Classification Search
CPC .. G06F 1/1681; G06F 1/1618; H04M 1/0222; H04M 1/21; H04M 1/0268; H04M 1/0216
See application file for complete search history.

(56) References Cited

U.S. PATENT DOCUMENTS

| 7,414,834 | B2 | 8/2008 | Ukonaho et al. | |
|---|---|---|---|---|
| 9,388,614 | B2 * | 7/2016 | Hsu | E05D 3/12 |
| 10,253,804 | B2 * | 4/2019 | Park | E05D 11/105 |
| 10,931,070 | B1 * | 2/2021 | Files | H01R 24/40 |
| 11,106,248 | B2 * | 8/2021 | Campbell | H04M 1/022 |
| 2015/0245511 | A1 * | 8/2015 | Hsu | H04M 1/02 74/63 |
| 2016/0147267 | A1 * | 5/2016 | Campbell | E05D 3/06 16/369 |
| 2018/0066465 | A1 * | 3/2018 | Tazbaz | E05D 11/1007 |
| 2020/0064890 | A1 * | 2/2020 | Siddiqui | G06F 1/1681 |

FOREIGN PATENT DOCUMENTS

CN 108388311 A 8/2018

OTHER PUBLICATIONS

Chinese language office action dated Aug. 30, 2021, issued in application No. TW 109130883.

* cited by examiner

*Primary Examiner* — Rockshana D Chowdhury
(74) *Attorney, Agent, or Firm* — McClure, Qualey & Rodack, LLP

(57) ABSTRACT

An electronic device is provided, including a first module, a second module, a hinge member, a first rotary member, a second rotary member, and a wire. The first module and the second module are hinged to the hinge member. The first rotary member and the second rotary member are connected to the hinge member and rotatable around a first axis and a second axis relative to the hinge member, respectively. The wire extends through the first rotary member and the second rotary member to electrically connect the first module and the second module.

7 Claims, 8 Drawing Sheets

ELECTRONIC DEVICE

CROSS REFERENCE TO RELATED APPLICATIONS

This application claims priority of Taiwan Patent Application No. 109130883, filed on Sep. 9, 2020, the entirety of which is incorporated by reference herein.

BACKGROUND OF THE INVENTION

Field of the Invention

The present invention relates to an electronic device, and, in particular, to a foldable electronic device.

DESCRIPTION OF THE RELATED ART

In general, most conventional mobile phones and tablets are only equipped with a single display screen. When reading or browsing websites, it would be more convenient for users if the display screen area of their mobile phone or tablet were larger. However, such an increase would lead to a larger device, with more volume, and such a device would be inconvenient to carry or store.

Therefore, it is important to design an electronic device that may be equipped with multiple screens while being easy to store.

BRIEF SUMMARY OF THE INVENTION

In view of the aforementioned issue, one of the embodiments of the present invention provides an electronic device, including a first module, a second module, a hinge member, a first rotary member, a second rotary member, and a wire. The hinge member is hinged to the first module and the second module. The first rotary member is movably connected to the hinge member and rotatable around a first axis relative to the hinge member. The second rotary member is movably connected to the hinge member and rotatable around a second axis relative to the hinge member, wherein the second axis is parallel to the first axis. The wire extends through the first rotary member and the second rotary member to electrically connect the first module and the second module.

In one of the embodiments, the first rotary member has two arc-shaped first sidewalls and two first recesses. The first recesses are located between the first sidewalls. The wire extends through the first recesses.

In one of the embodiments, the second rotary member has two arc-shaped second sidewalls and two second recesses. The second recesses are located between the second sidewalls. The wire extends through the first recesses and the second recesses.

In one of the embodiments, the electronic device further includes a third rotary member. The third rotary member is connected to the first rotary member, and is rotatable around the first axis relative to the hinge member. The wire is restricted between the first rotary member and the third rotary member.

In one of the embodiments, the first rotary member is formed with a circular groove. The third rotary member is slidable in the groove.

In one of the embodiments, the electronic device further includes a locking member. The first module has a case and a side frame that are connected together. The third rotary member is formed with a hole. The locking member extends through the side frame and into the hole.

In one of the embodiments, the electronic device further includes a fourth rotary member. The fourth rotary member is connected to the second rotary member, and is rotatable around the second axis relative to the hinge member. The wire is restricted between the second rotary member and the fourth rotary member.

In one of the embodiments, the second rotary member is formed with a circular groove. The fourth rotary member is slidable in the groove.

In one of the embodiments, the electronic device further includes a locking member. The second module has a case and a side frame that are connected together. The fourth rotary member is formed with a hole. The locking member extends through the side frame and into the hole.

In one of the embodiments, the hinge member is formed with two axial bores. The first rotary member and the second rotary member are respectively formed with a first protrusion and a second protrusion. The first protrusion and the second protrusion are hinged within the axial bores.

In one of the embodiments, the electronic device further includes a first fixed member, a second fixed member, and a plurality of gears. The first fixed member and the second fixed member are respectively fixed on the first module and the second module. The plurality of gears connect the hinge member, the first fixed member, and the second fixed member.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
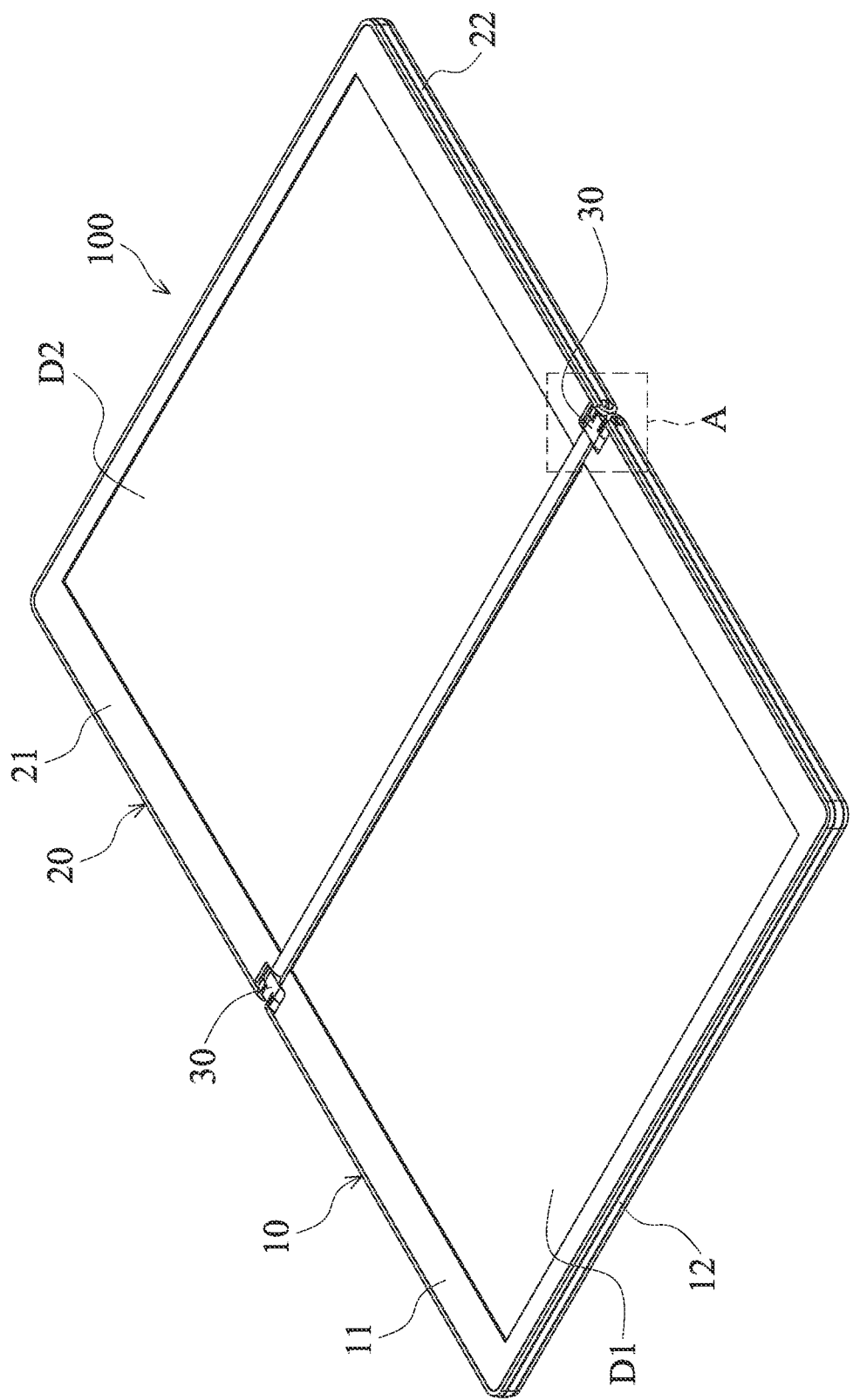
FIG. 1 shows a perspective view of the electronic device 100 according to an embodiment of the present invention.

In the following detailed description, an electronic device in some embodiments of the present invention is disclosed.

It will be apparent, however, that specific embodiments are only disclosed for specific use of the present invention, not for limitation on the scope of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

Figure 2:
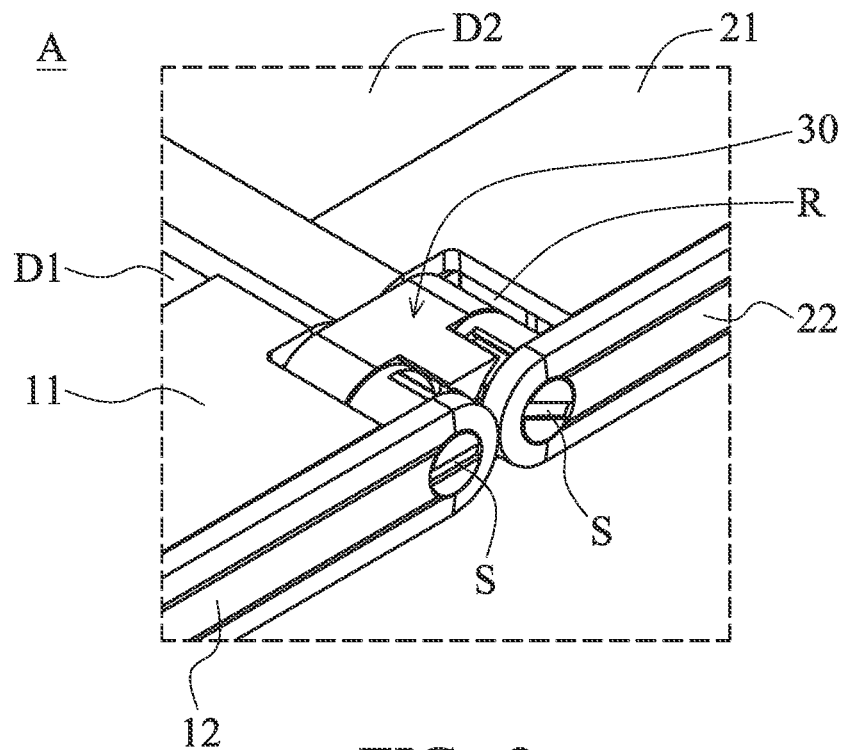
FIG. 2 shows an enlarged view of a portion A in FIG. 1.

Referring to FIGS. 1 and 2, FIG. 1 shows a perspective view of the electronic device 100 according to an embodiment of the present invention, and FIG. 2 shows an enlarged view of a portion A in FIG. 1.

As shown in FIGS. 1 and 2, the electronic device 100 of the present embodiment may be a foldable mobile phone, a tablet, or a laptop, for example. The electronic device 100 mainly includes a first module 10, a second module 20, and two hinge mechanisms 30. The hinge mechanisms 30 are disposed between the first module 10 and the second module 20 for pivotably connecting the second module 20 to the first module 10. Consequently, the second module 20 may be rotatable relative to the first module 10, in order to be displayed in different positions and angles.

In the present embodiment, the first module 10 has a case 11 and a side frame 12. The side frame 12 is fixed around the exterior of the case 11. A display screen D1 is disposed in the center of the case 11 for displaying digital images. Similarly, the second module 20 has a case 21 and a side frame 22. The side frame 22 is fixed around the exterior of the case 21. A display screen D2 is disposed in the center of the case 21 for displaying digital images. It should be understood that the display screens D1 and D2 may be respectively disposed on the first module 10 and the second module 20 of the electronic device 100 in the present embodiment. However, the display screens may also be disposed on only one of the first module 10 and the second module 20. The disclosed embodiments are, of course, merely examples and are not intended to be limiting.

In addition, as shown in FIG. 2, a receiving space R is formed between the first module 10 and the second module 20 for receiving the hinge mechanism 30. The two locking members S respectively extend through the side frames 12 and 22 of the first module 10 and the second module 20 for pivotably connecting the first module 10 to the second module 20. At the same time, the locking members S may restrict the hinge mechanisms 30 inside the receiving space R, preventing the hinge mechanisms 30 from falling out of the receiving space R.

Figure 3:
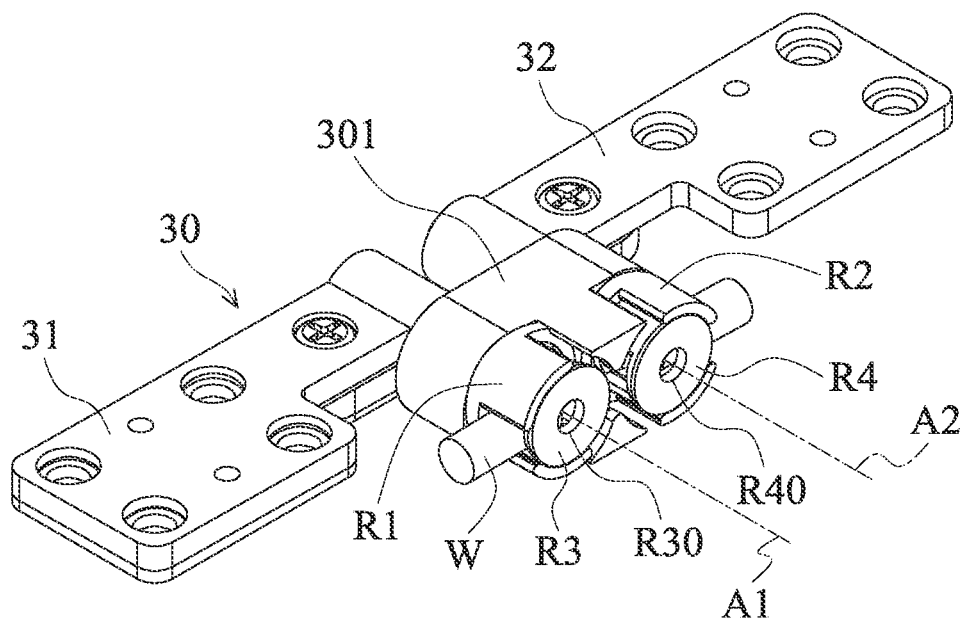
FIG. 3 shows a perspective view of the hinge mechanism 30 shown in FIGS. 1 and 2.

Referring to FIG. 3, FIG. 3 shows a perspective view of the hinge mechanism 30 shown in FIGS. 1 and 2. As shown in FIG. 3, the hinge mechanism 30 in the present embodiment mainly includes a hinge member 301, a first fixed member 31, and a second fixed member 32. The first fixed member 31 is screwed onto the first module 10, and the second fixed member 32 is screwed onto the second module 20. The first fixed member 31 and the second fixed member 32 are hinged together by the hinge member 301.

It should be noted that said hinge mechanism 30 further includes a first rotary member R1, a second rotary member R2, a third rotary member R3, and a fourth rotary member R4. The first rotary member R1 and the second rotary member R2 are movably disposed on the hinge member 301. The first rotary member R1 and the second rotary member R2 are rotatable around the first axis A1 and the second axis A2 relative to the hinge member 301, respectively. Additionally, the third rotary member R3 and the fourth rotary member R4 are disposed on the first rotary member R1 and the second rotary member R2, respectively. The third rotary member R3 and the fourth rotary member R4 are rotatable around the first axis A1 and the second axis A2 relative to the hinge member 301, respectively. The second axis A2 is parallel to the first axis A1.

It should be understood that there is a flexible wire W extending through the hollow first rotary member R1, the second rotary member R2, the third rotary member R3, and the fourth rotary member R4 to electrically connect the first module 10 and the second module 20, thereby providing a function of transmitting electronic signals.

Still referring to FIG. 3, as shown in FIG. 3, the end surfaces of the third rotary member R3 and the fourth rotary member R4 are formed with holes R30 and R40 thereon. The locking members S may pass through the side frames 12 and 22 of the first module 10 and the second module 20 (as shown in FIG. 2), and extend into the holes R30 and R40. Thus, the first module 10 and the second module 20 are hinged together. At the same time, the hinge mechanism 30 may be restricted inside the receiving space R as shown in FIG. 2.

Figure 4:
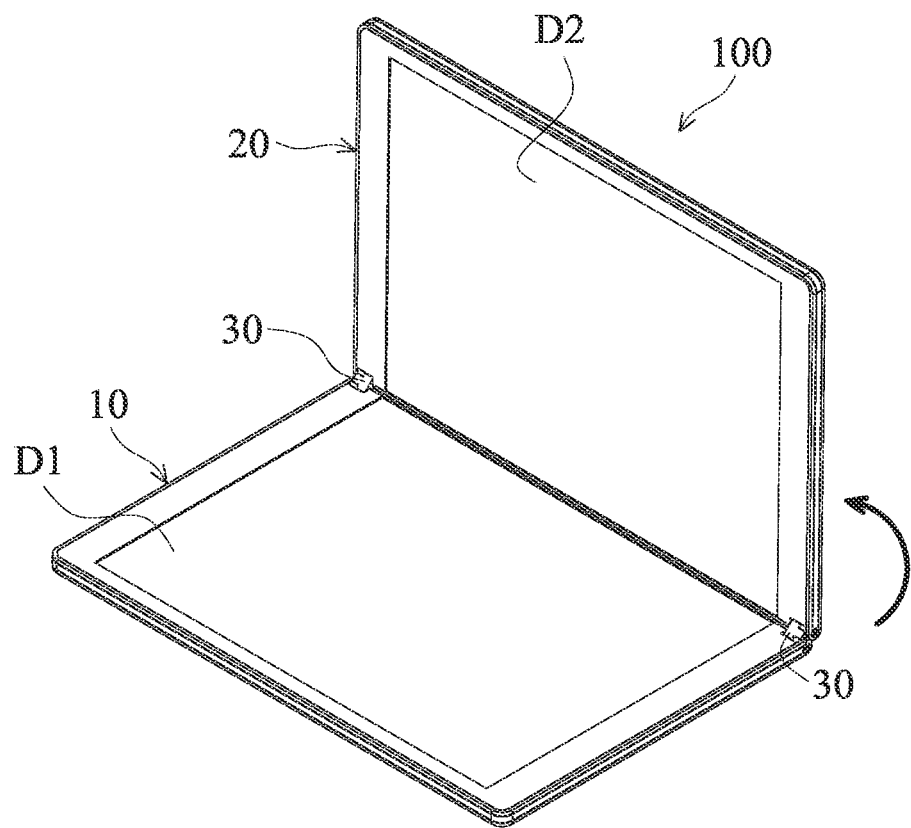
FIG. 4 shows a schematic view of the second module 20 when rotated 90 degrees forward relative to the first module 10 from the state shown in FIG. 1.
Figure 5:
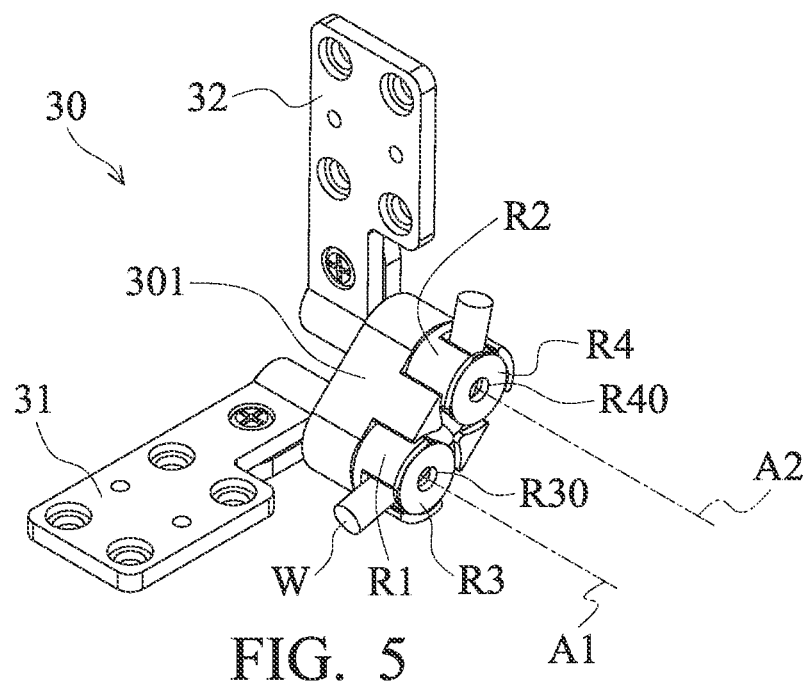
FIG. 5 shows a perspective view of the hinge mechanism 30 shown in FIG. 4.

Next, referring to FIGS. 4 and 5, FIG. 4 shows a schematic view of the second module 20 when rotated 90 degrees forward relative to the first module 10 from the state shown in FIG. 1. FIG. 5 shows a perspective view of the hinge mechanism 30 shown in FIG. 4.

As shown in FIGS. 4 and 5, when the second module 20 is rotated 90 degrees forward relative to the first module 10 from the state shown in FIG. 1, there is a 90 degree angle formed between the display screens D1 and D2. Since the first rotary member R1 and the second rotary member R2 of the hinge mechanism 30 are rotatable around the first axis A1 relative to the hinge member 301, and the third rotary member R3 and the fourth rotary member R4 are also rotatable around the second axis A2 relative to the hinge member 301, the wire W that passes through the first rotary member R1, the second rotary member R2, the third rotary member R3, and the fourth rotary member R4 may be properly bent without causing mechanical interference with the hinge mechanism 30.

Figure 6:
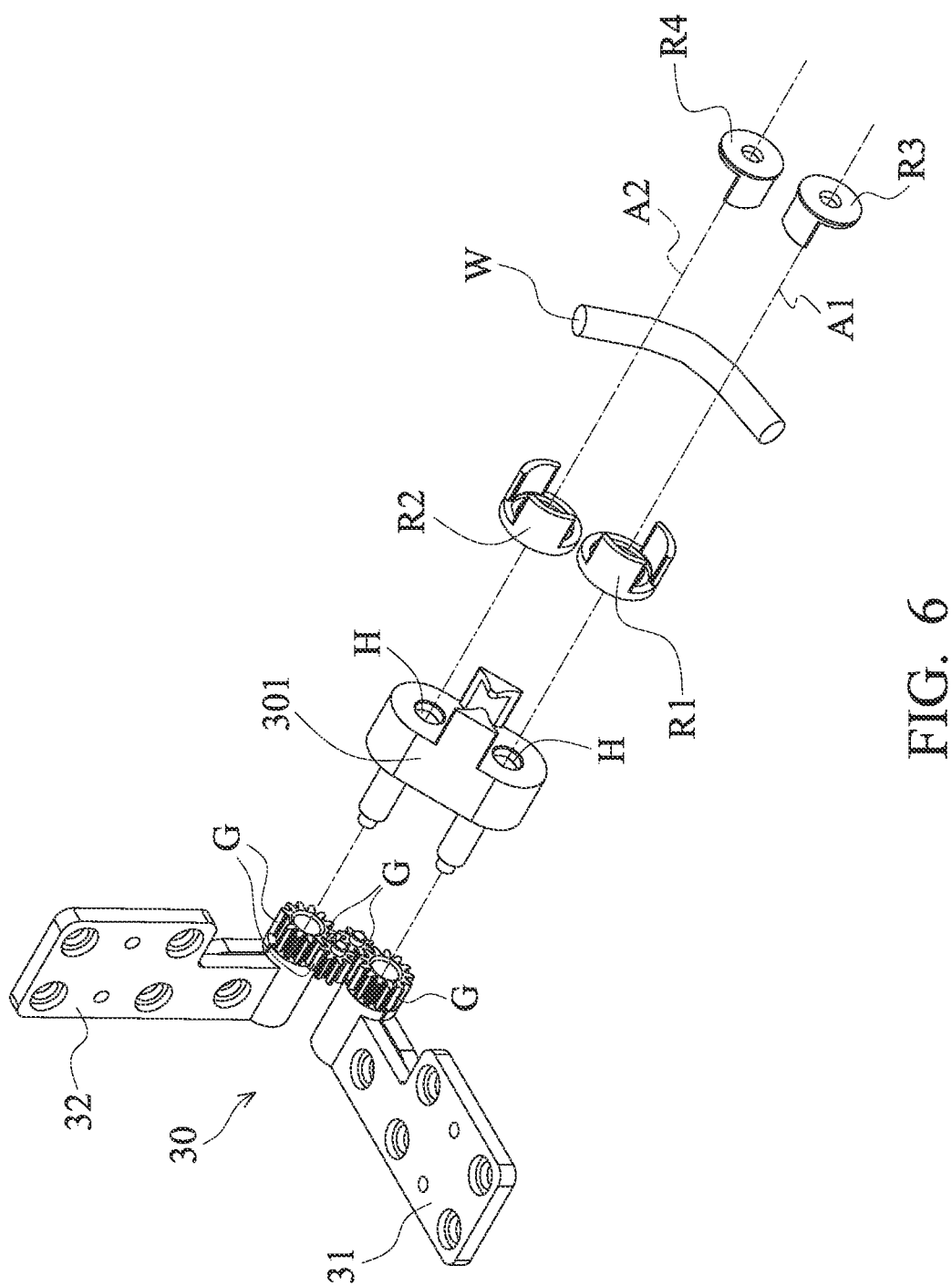
FIGS. 6 and 7 show exploded views of the hinge mechanism 30 shown in FIG. 5 in different viewing angles.
Figure 7:
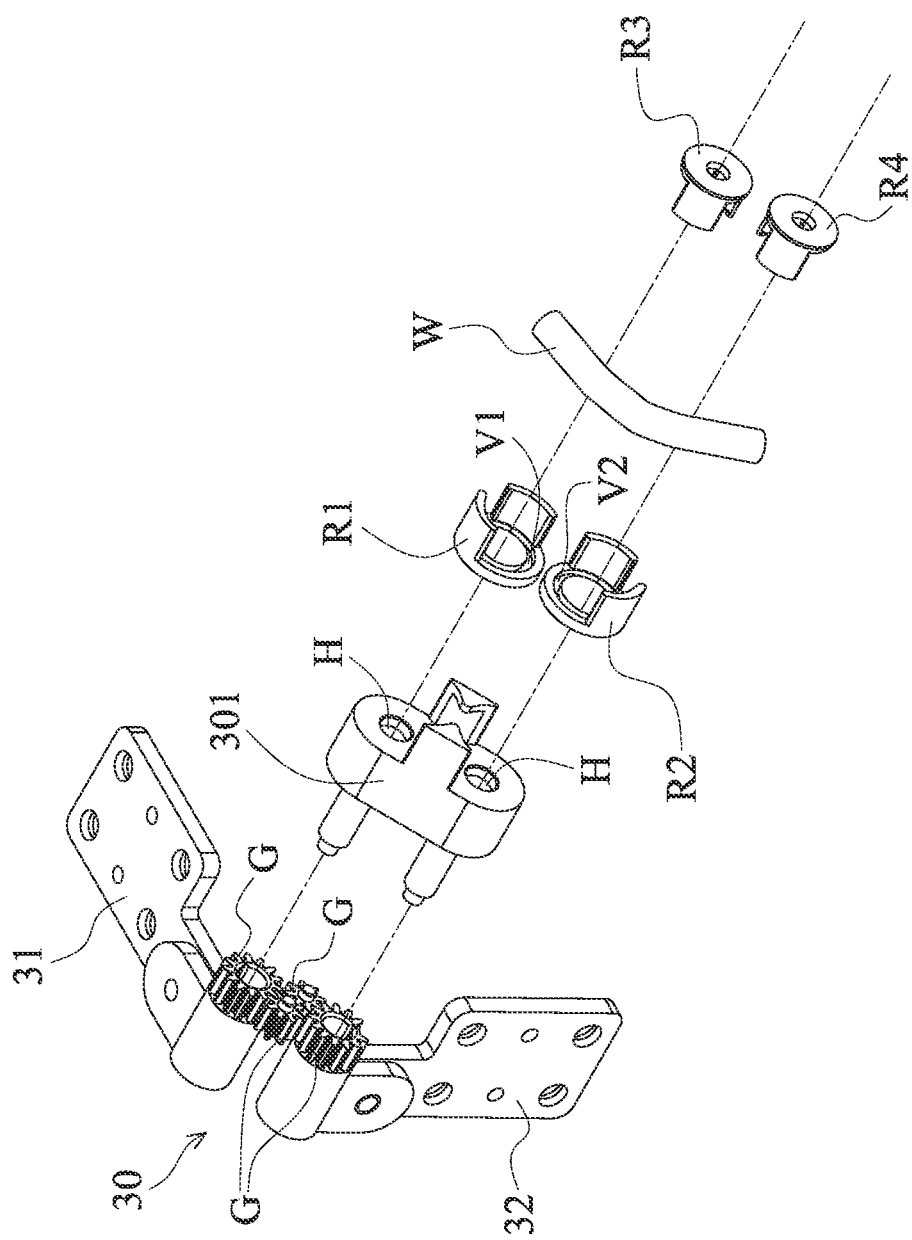

Referring to FIGS. 6 and 7, FIGS. 6 and 7 show exploded views of the hinge mechanism 30 shown in FIG. 5 in different viewing angles. As shown in FIGS. 6 and 7, in the hinge mechanism 30 of the present embodiment, the first fixed member 31 and the second fixed member 32 may be coupled by a plurality of gears G. Thus, the first fixed member 31 and the second fixed member 32 may respectively rotate around the first axis A1 and the second axis A2 relative to the hinge member 301 in symmetry.

It should be noted that there are two axial bores H formed on the hinge member 301, which may pivotably connect the first rotary member R1 and the second rotary member R2, respectively. In addition, there are circular grooves V1 and V2 formed on the first rotary member R1 and the second rotary member R2, respectively. The third rotary member R3 is slidably disposed within the groove V1, rotatable around the first axis A1 relative to the hinge member 301 and the first rotary member R1. Similarly, the fourth rotary member R4 is slidably disposed within the groove V2, rotatable around the second axis A2 relative to the hinge member 301 and the second rotary member R2.

Figure 8:
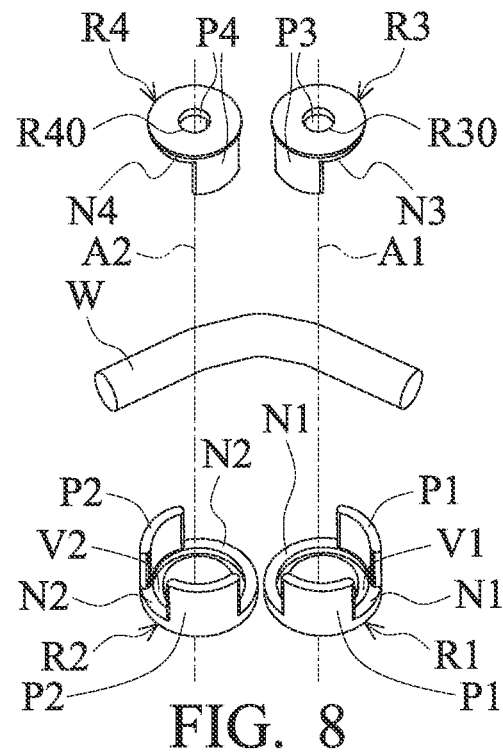
FIGS. 8 and 9 show exploded views of the first rotary member R1, the second rotary member R2, the third rotary member R3, the fourth rotary member R4, and the wire W shown in FIGS. 6 and 7 in different viewing angles.
Figure 9:
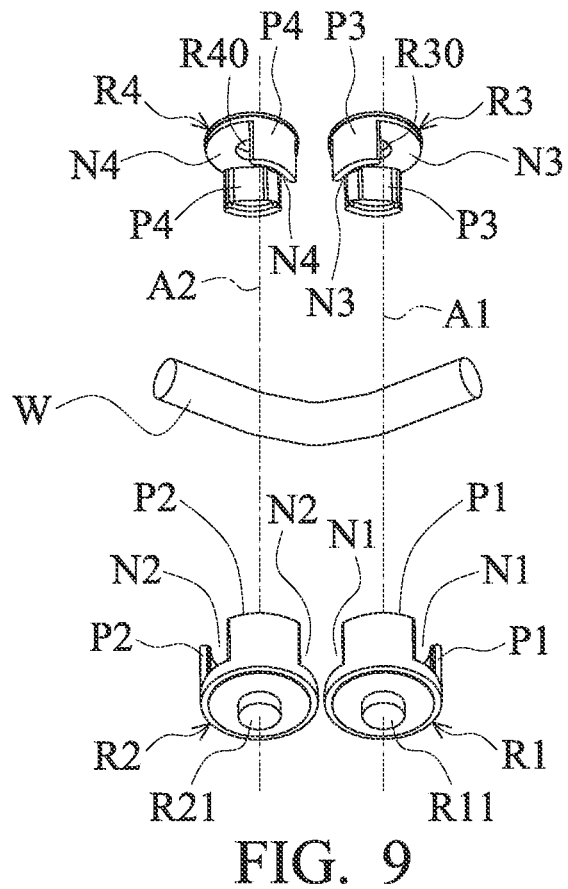

Next, referring to FIGS. 8 and 9, FIGS. 8 and 9 show exploded views of the first rotary member R1, the second rotary member R2, the third rotary member R3, the fourth rotary member R4, and the wire W shown in FIGS. 6 and 7 in different viewing angles.

As shown in FIGS. 8 and 9, the first rotary member R1 is formed with two arc-shaped first sidewalls P1 and two first recesses N1. The first recesses N1 are located between the first sidewalls P1. Similarly, the second rotary member R2 is formed with two arc-shaped second sidewalls P2 and two second recesses N2. The second recesses N2 are located between the second sidewalls P2. After assembling, the wire W extends through the first recesses N1 and the second recesses N2.

On the other hand, it is also shown in FIGS. 8 and 9 that the third rotary member R3 is movably connected to the first rotary member R1 and rotatable around the first axis A1 relative to the hinge member 301 and the first rotary member R1. It should be understood that the third rotary member R3 is formed with two arc-shaped third sidewalls P3 and two third recesses N3. The third recesses N3 are located between the third sidewalls P3. After assembling, the wire W passes through the first recesses N1 and the third recesses N3, so that the wire W is disposed between the first rotary member R1 and the third rotary member R3. Since the third sidewalls P3 is slidable within the groove V1 of the first rotary member R1, the mechanical interference between the third rotary member R3 and the wire W may be reduced.

Similarly, the fourth rotary member R4 is movably connected to the second rotary member R2 and rotatable around the second axis A2 relative to the hinge member 301 and the second rotary member R2. It should be understood that the fourth rotary member R4 is formed with two arc-shaped fourth sidewalls P4 and two fourth recesses N4. The fourth recesses N4 are located between the fourth sidewalls P4. After assembling, the wire W passes through the second recesses N2 and the fourth recesses N4, so that the wire W is disposed between the second rotary member R2 and the fourth rotary member R4. Since the fourth sidewalls P4 is slidable within the groove V2 of the second rotary member R2, the mechanical interference between the fourth rotary member R4 and the wire W may be reduced.

As shown in FIG. 9, a first protrusion R11 and a second protrusion R21 are formed on the end surfaces of the first rotary member R1 and the second rotary member R2. During assembling, the first protrusion R11 and the second protrusion R21 are hinged within the axial bores H of the hinge member 301, respectively.

Figure 10:
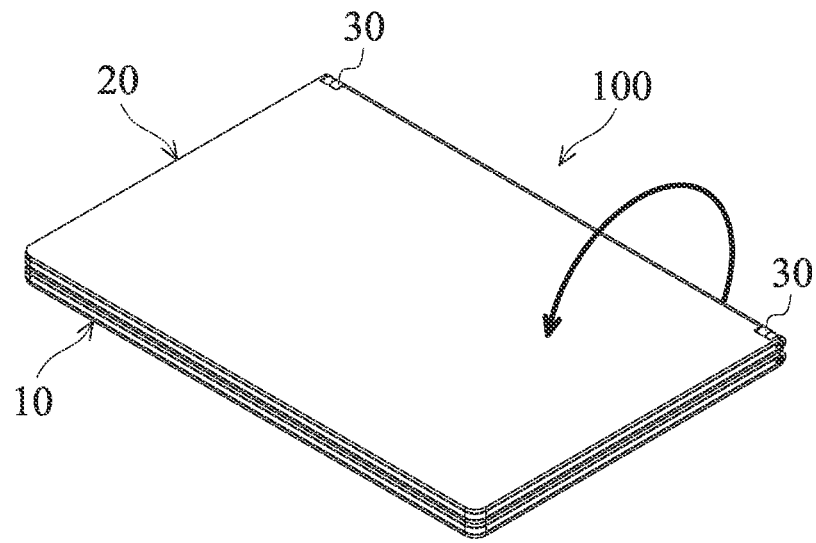
FIG. 10 shows a schematic view of the second module 20 when rotated 180 degrees forward relative to the first module 10 from the state shown in FIG. 1.
Figure 11:
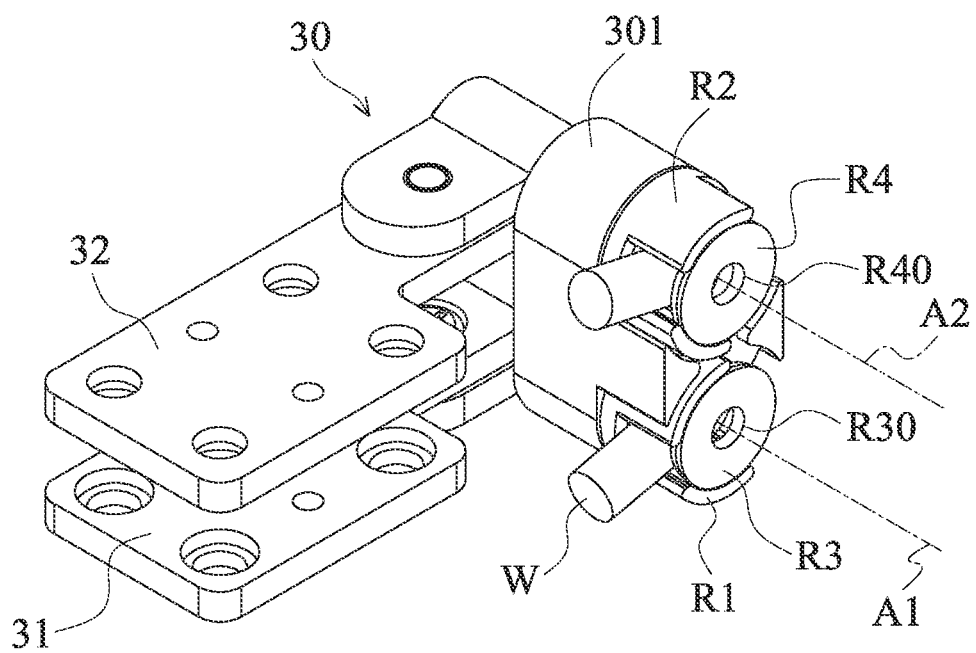
FIG. 11 shows a perspective view of the hinge mechanism 30 shown in FIG. 10.

Referring to FIGS. 10 and 11, FIG. 10 shows a schematic view of the second module 20 when rotated 180 degrees forward relative to the first module 10 from the state shown in FIG. 1. FIG. 11 shows a perspective view of the hinge mechanism 30 shown in FIG. 10.

As shown in FIGS. 10 and 11, when the second module 20 is rotated 180 degrees forward relative to the first module 10 from the state shown in FIG. 1, the display screen D2 faces the display screen D1 so that the electronic device 100 is in a closed state. In this state, since the first rotary member R1 and the second rotary member R2 of the hinge mechanism 30 are rotatable around the first axis A1 relative to the hinge member 301, and the third rotary member R3 and the fourth rotary member R4 are also rotatable around the second axis A2 relative to the hinge member 301, the wire W that passes through the first rotary member R1, the second rotary member R2, the third rotary member R3, and the fourth rotary member R4 may be properly bent without causing mechanical interference with the hinge mechanism 30.

Figure 12:
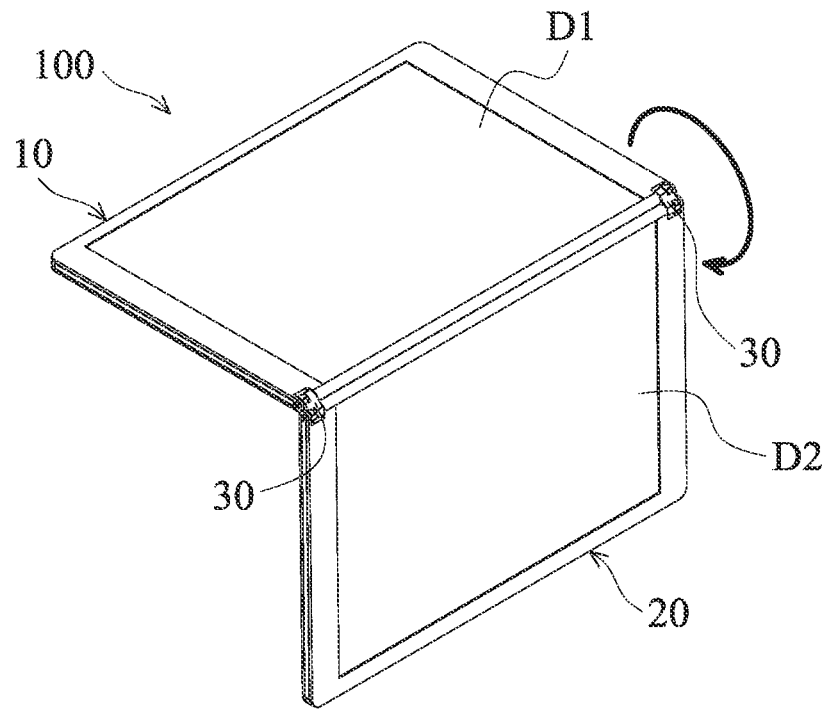
FIG. 12 shows a schematic view of the second module 20 when rotated 90 degrees backward relative to the first module 10 from the state shown in FIG. 1.
Figure 13:
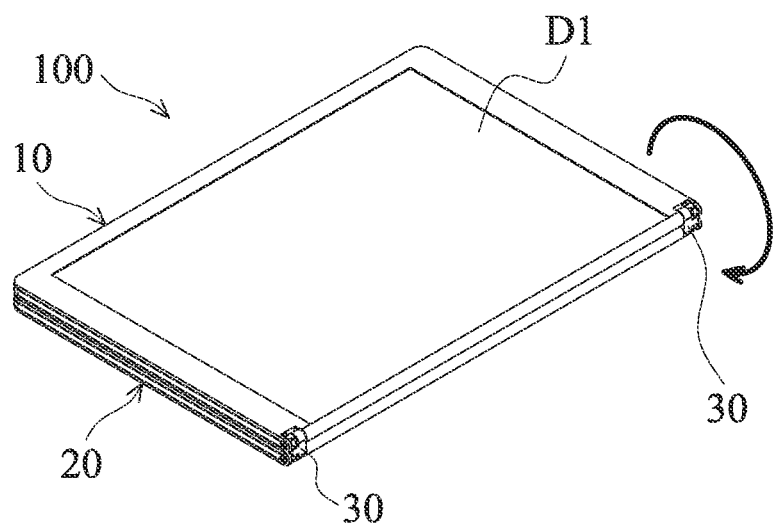
FIG. 13 shows a schematic view of the second module 20 when rotated 180 degrees backward relative to the first module 10 from the state shown in FIG. 1.

Referring to FIGS. 12 and 13, FIG. 12 shows a schematic view of the second module 20 when rotated 90 degrees backward relative to the first module 10 from the state shown in FIG. 1. FIG. 13 shows a schematic view of the second module 20 when rotated 180 degrees backward relative to the first module 10 from the state shown in FIG. 1.

As shown in FIGS. 12 and 13, the electronic device 100 of the present embodiment also allows the second module 20 to rotate 90 degrees backward relative to the first module 10 from the state shown in FIG. 1 (FIG. 12). Alternatively, the second module 20 may also rotate 180 degrees backward relative to the first module 10 from the state shown in FIG. 1 (FIG. 13), so that the display screens D1 and D2 of the first module 10 and the second module 20 may face in opposite directions of the electronic device 100. This provides more convenience for users to video chat, to browse websites, or for presentation, etc.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure.

Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a first module;
a second module;
a hinge member hinged to the first module and the second module;
a first rotary member, movably connected to the hinge member and rotatable around a first axis relative to the hinge member, wherein the first rotary member is formed with a circular groove;
a second rotary member, movably connected to the hinge member and rotatable around a second axis relative to the hinge member, wherein the second axis is parallel to the first axis;
a third rotary member, connected to the first rotary member and rotatable around the first axis relative to the hinge member, wherein the third rotary member has sidewalls that are slidable in the circular groove; and
a wire extending through the first rotary member and the second rotary member to electrically connect the first module and the second module, wherein the wire is restricted between the first rotary member and the third rotary member.

2. The electronic device as claimed in claim 1, wherein the first rotary member has two arc-shaped first sidewalls and two first recesses, the first recesses are located between the first sidewalls, and the wire extends through the first recesses.

3. The electronic device as claimed in claim 2, wherein the second rotary member has two arc-shaped second sidewalls and two second recesses, the second recesses are located between the second sidewalls, and the wire extends through the first recesses and the second recesses.

4. The electronic device as claimed in claim 1, further comprising a locking member, wherein the first module has a case and a side frame that are connected together, and the third rotary member is formed with a hole, wherein the locking member extends through the side frame and into the hole.

5. An electronic device, comprising:
a first module;
a second module;
a hinge member hinged to the first module and the second module;
a first rotary member, movably connected to the hinge member and rotatable around a first axis relative to the hinge member;
a second rotary member, movably connected to the hinge member and rotatable around a second axis relative to the hinge member, wherein the second axis is parallel to the first axis, wherein the second rotary member is formed with a circular groove;
a third rotary member, connected to the first rotary member and rotatable around the first axis relative to the hinge member;
a fourth rotary member, connected to the second rotary member and rotatable around the second axis relative to the hinge member, wherein the fourth rotary member has sidewalls that are slidable in the circular groove; and
a wire extending through the first rotary member and the second rotary member to electrically connect the first module and the second module, wherein the wire is restricted between the first rotary member and the third rotary member, and the wire is restricted between the second rotary member and the fourth rotary member.

6. The electronic device as claimed in claim 5, further comprising a locking member, wherein the second module has a case and a side frame that are connected together, and the fourth rotary member is formed with a hole, wherein the locking member extends through the side frame and into the hole.

7. The electronic device as claimed in claim 1, wherein the hinge member is formed with two axial bores, and the first rotary member and the second rotary member are respectively formed with a first protrusion and a second protrusion, wherein the first protrusion and the second protrusion are hinged within the axial bores.

* * * * *